F. KING.
CORN HARVESTING MACHINE.
APPLICATION FILED JULY 30, 1909.

987,378.

Patented Mar. 21, 1911.
6 SHEETS—SHEET 2.

Witnesses
Inventor
Floyd King
By
Attorneys

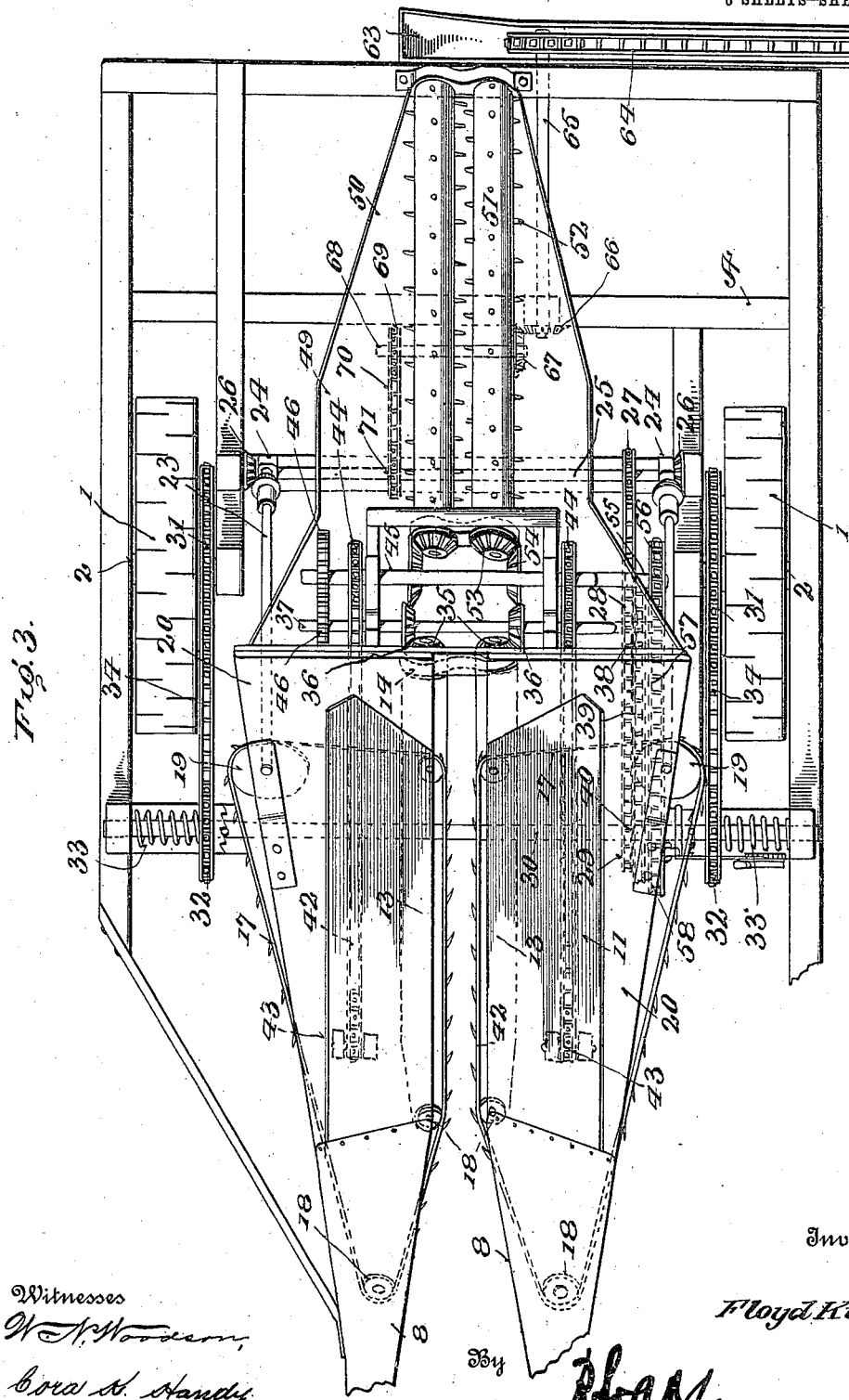

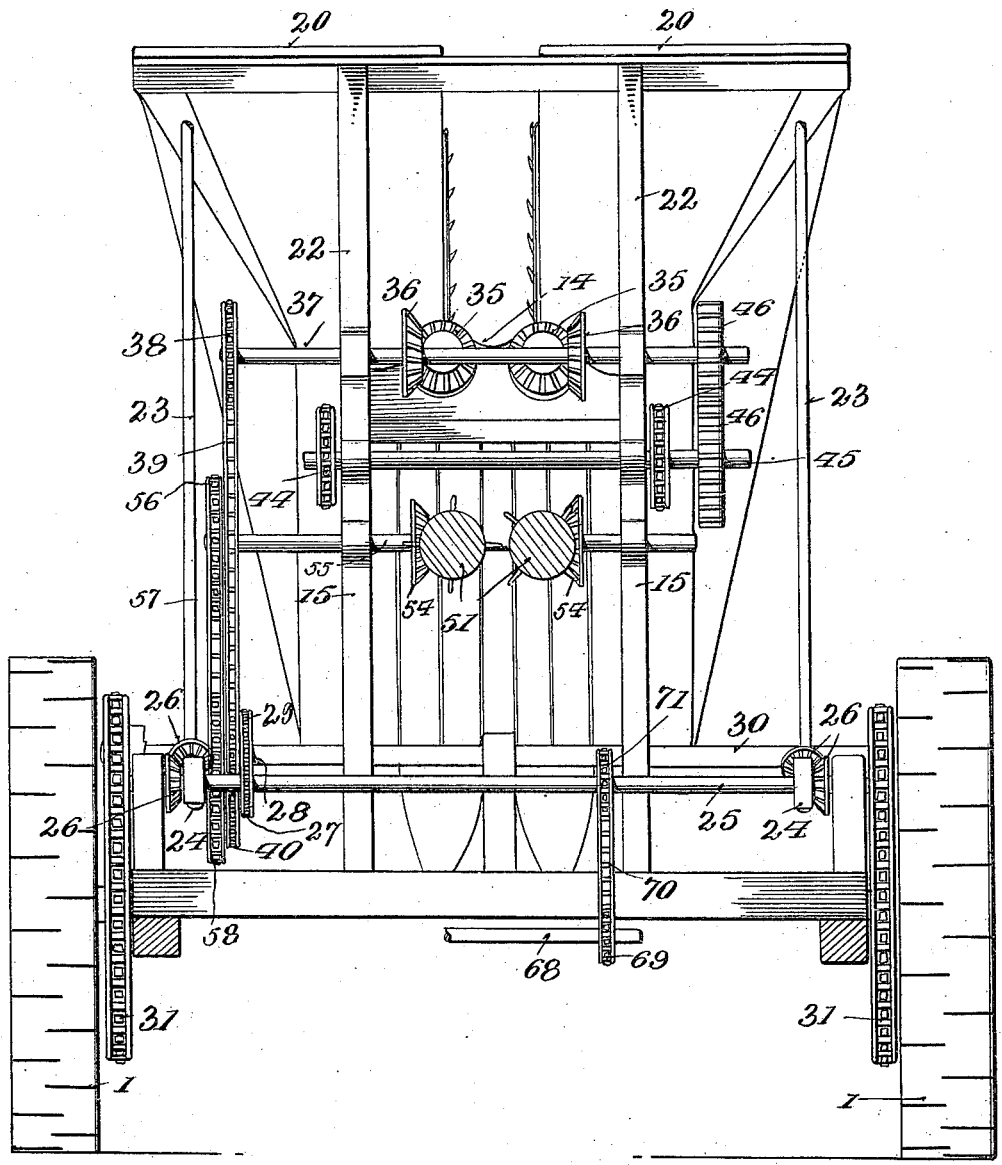

F. KING.
CORN HARVESTING MACHINE.
APPLICATION FILED JULY 30, 1909.
987,378.
Patented Mar. 21, 1911.
6 SHEETS—SHEET 5.
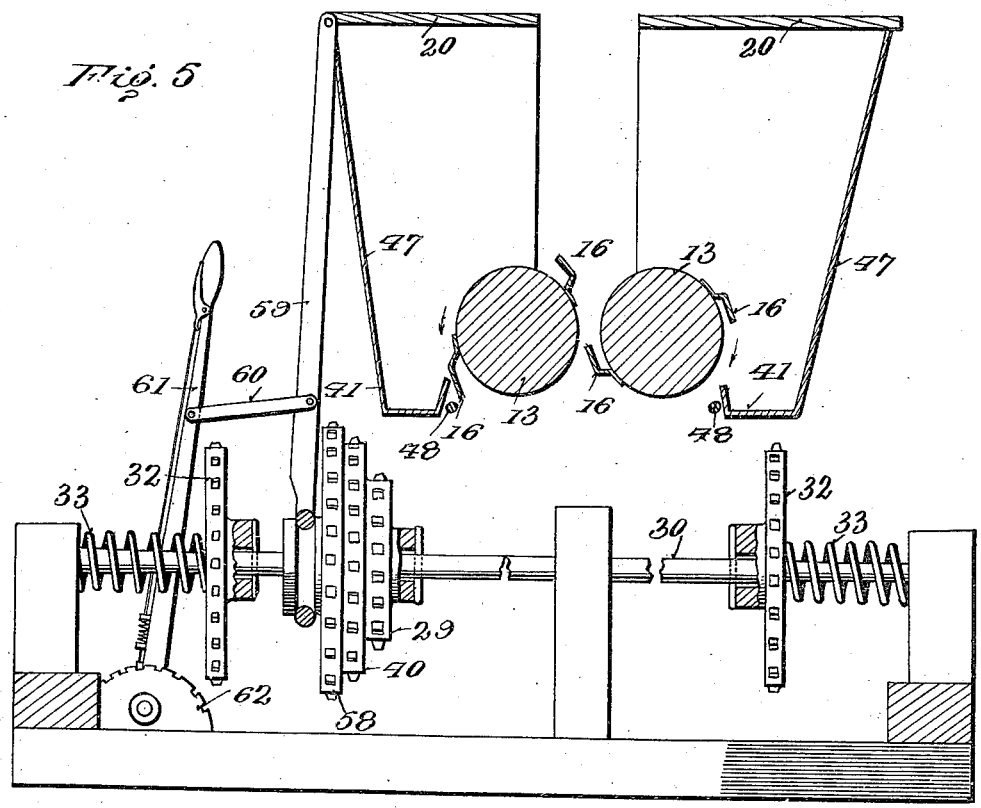
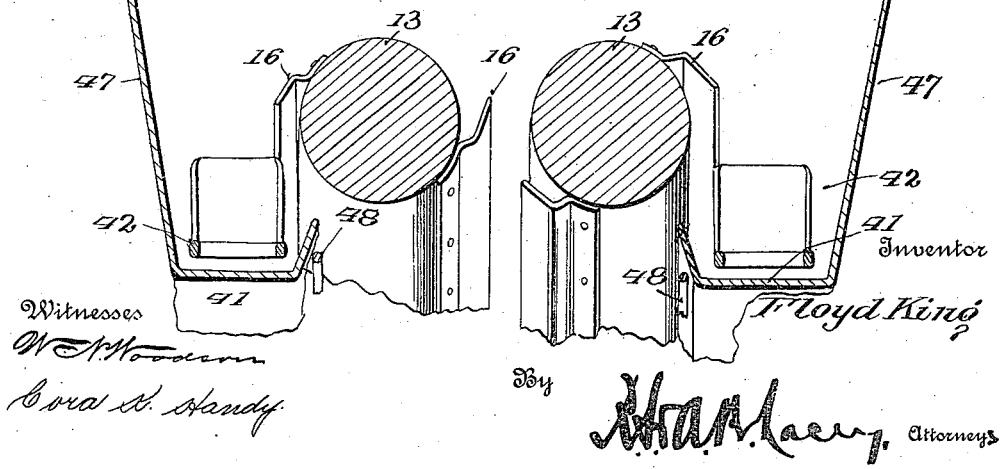

F. KING.
CORN HARVESTING MACHINE.
APPLICATION FILED JULY 30, 1909.
987,378.
Patented Mar. 21, 1911.
6 SHEETS—SHEET 6.
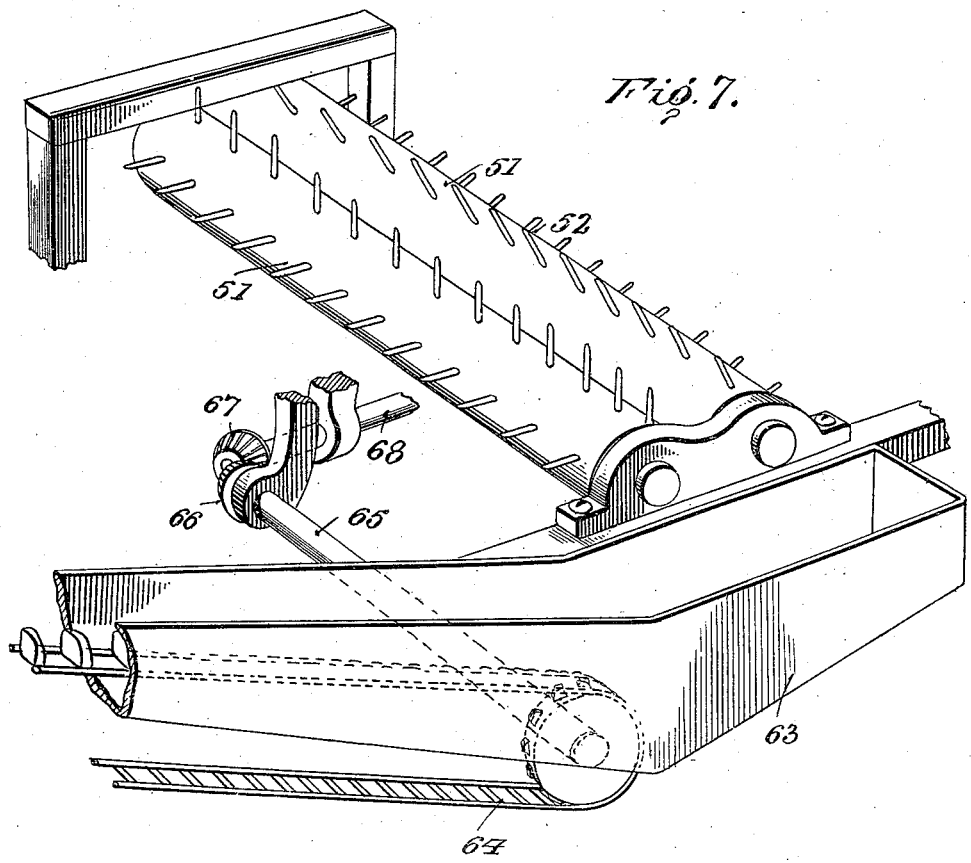
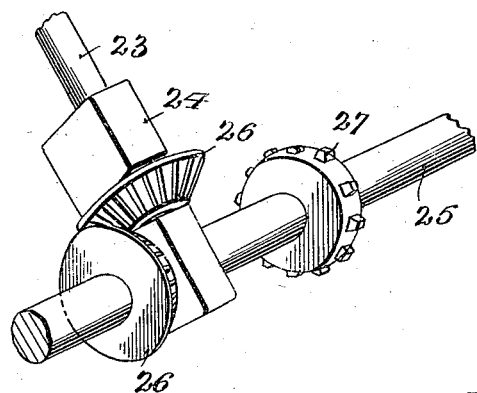
Witnesses
Inventor
Floyd King
By
Attorneys

UNITED STATES PATENT OFFICE.

FLOYD KING, OF ROCKWELL, IOWA.

CORN-HARVESTING MACHINE.

987,378. Specification of Letters Patent. Patented Mar. 21, 1911.

Application filed July 30, 1909. Serial No. 510,362.

*To all whom it may concern:*

Be it known that I, FLOYD KING, a citizen of the United States, residing at Rockwell, in the county of Cerro Gordo and State of Iowa, have invented certain new and useful Improvements in Corn-Harvesting Machines, of which the following is a specification.

This invention comprehends certain new and useful improvements in corn harvesting machines, and the invention has for its primary object, an improved construction of machine of this character which will operate to snap the ears from the stalks in the field, pass the ears rearwardly and upwardly to the husking rolls which will effectively husk the ears, and which will finally pass the husked corn to an elevator, the latter depositing it in a wagon which is drawn forwardly alongside of the harvesting machine.

With these and other objects in view as will more fully appear as the description proceeds, the invention consists in certain constructions, arrangements and combinations of the parts that I shall hereinafter fully describe and claim.

Figure 1:
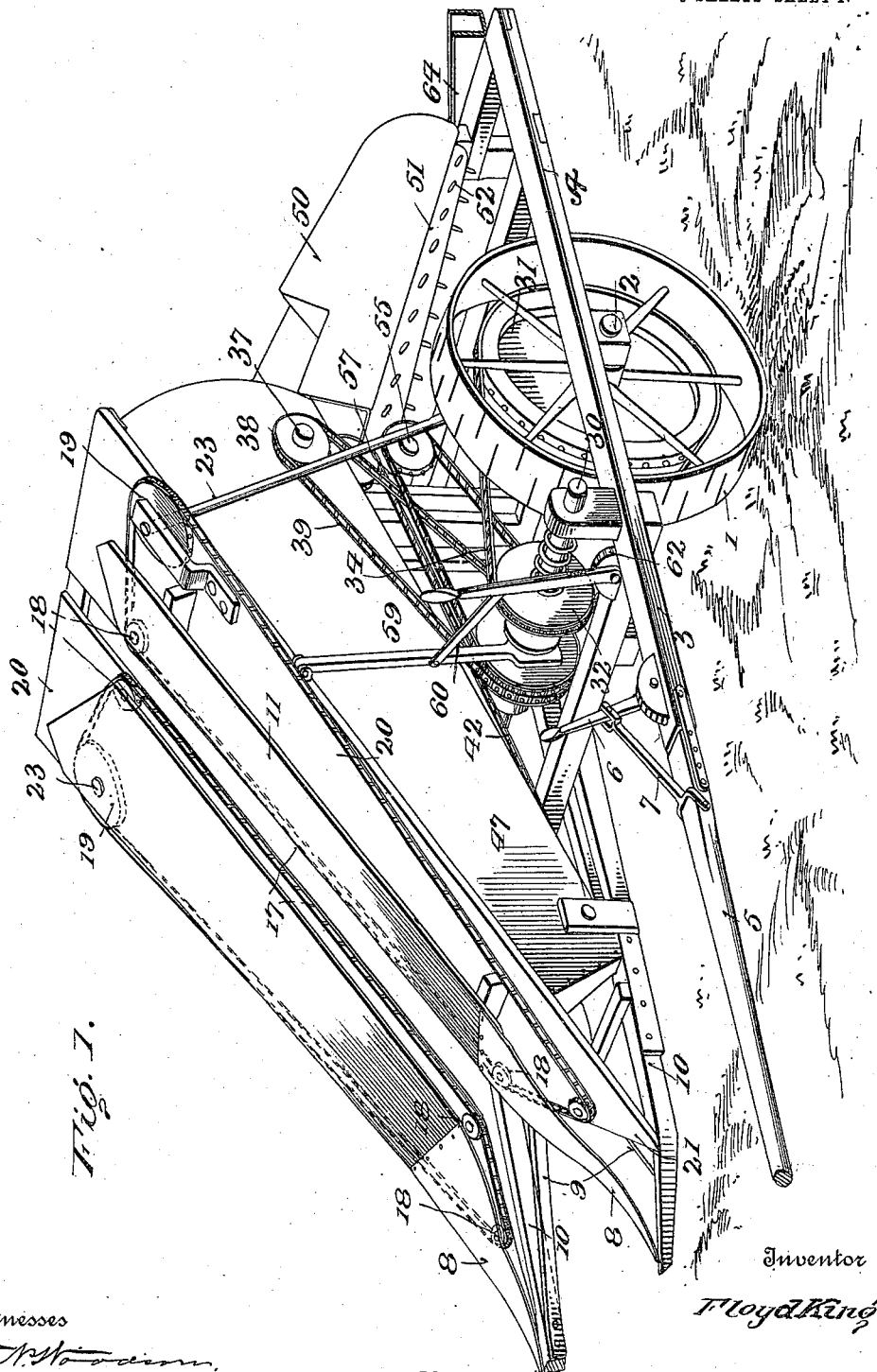
Figure 2:
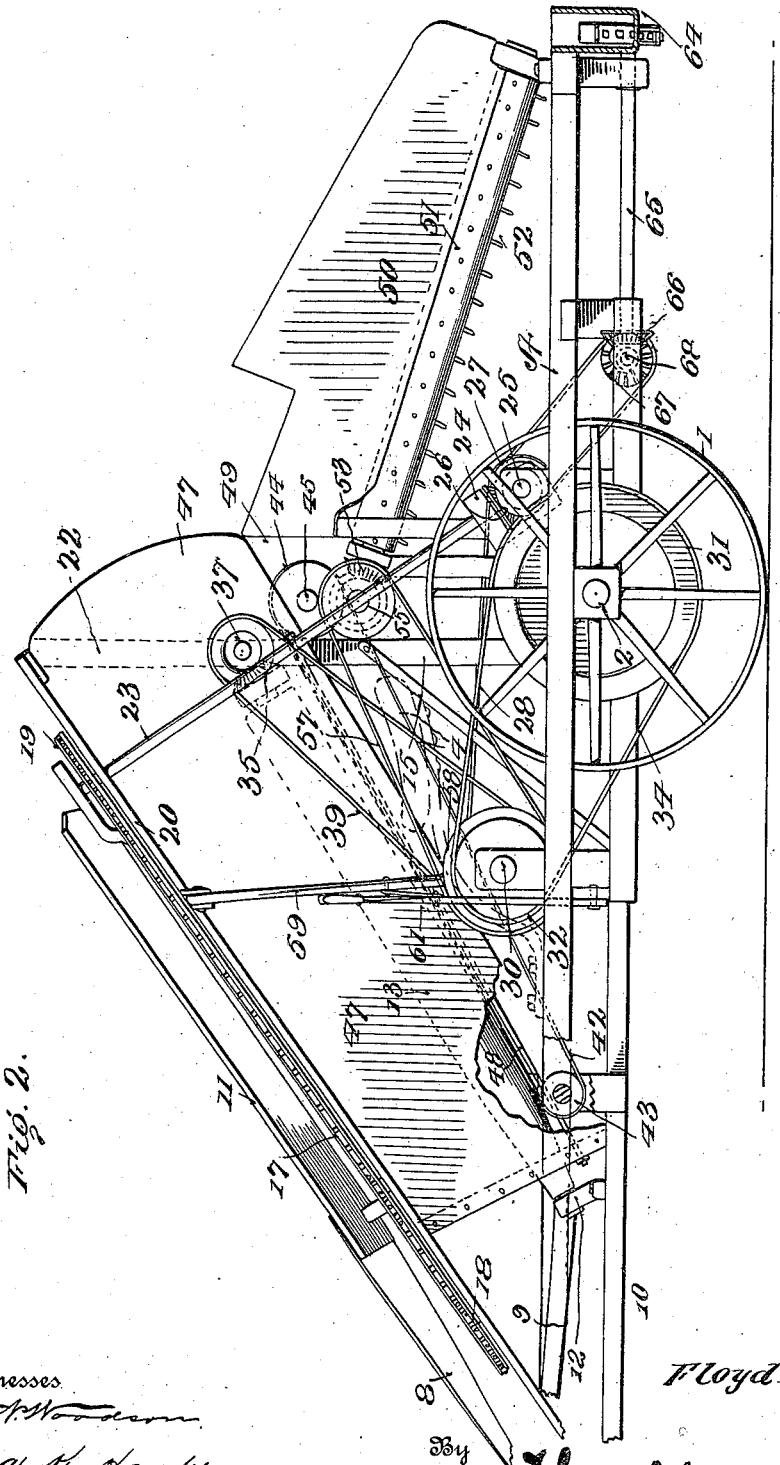

For a full understanding of the invention, reference is to be had to the following description and accompanying drawings in which:

Figure 1 is a perspective view of my improved corn harvesting machine; Fig. 2 is a side elevation thereof with parts in section; Fig. 3 is a top plan view of the machine; Fig. 4 is a rear elevation with parts in transverse section; Figs. 5 and 6 are transverse sectional views through the snapping rolls; Fig. 7 is a perspective view of the husking rolls and a portion of the actuating mechanism therefor, together with the delivery elevator; and, Fig. 8 is a perspective view of one of the bearing members for connecting together two of the shafts hereinafter specifically described.

Corresponding and like parts are referred to in the following description and indicated in all the views of the accompanying drawings by the same reference characters.

Referring to the drawings the numeral 1 designates the ground or traveling wheels of my improved corn harvesting machine, the same being journaled upon separate axles 2 mounted in the main supporting framework A. One of the side sills 3 of this framework is extended forwardly to form a draft beam upon which the driver's seat 4 is mounted, and a tongue or pole 5 is secured to the front end of the draft beam and is pivoted to turn about a horizontal axis, the elevation of the free end of the tongue being controlled by means of a hand lever 6 connected to the tongue by a link 7. As the machine travels over the field, the stalks will be passed in between rearwardly and upwardly extending straightening plates or guards 8 and rearwardly converging guide bars 9, said guards and guide bars being secured to the front ends of longitudinal beams 10 forming parts of the main supporting framework A. The rear ends of the guards 8 are connected to rearwardly and upwardly extending plates 11 that are set in transversely slanting positions as shown with their inner lower edges spaced from each other to form a guideway for the upper ends of the stalks as the machine is drawn forwardly. The rear ends of the guide bars 9 are connected to bearing brackets 12 that are secured to the beams 10 and that support the lower ends of the rearwardly inclined snapping rolls 13. The rear ends of said rolls are journaled in a bearing block 14 supported on a cross-bar which is secured to the upper ends of the standards 15 rising from and forming parts of the framework A. The rolls 13 are provided with snapping blades 16 that are set in angular relation to the peripheries of the rolls as clearly illustrated in Figs. 5 and 6, the blades of one roll preferably alternating with the blades of the other roll as the rolls are rotated to snap or strip the ears from the standing stalks. As the stalks are straightened up and passed in between the guards 8 and guide bars 9, they are assisted to stand upright while the ears are being snapped therefrom, by means of chains 17. These chains 17 have parallel stretches which project slightly into the space between the plates 11, extending longitudinally as shown, the said chains passing around guide rollers or idlers 18 and driving sprockets 19 which are mounted on the upper face of a two part inclined platform 20, said platform also supporting the slanting plates 11, as shown, the front ends of the two sections of the platform being tapered as indicated at 21 and secured to the forwardly extending ends of the beams 10 while the rear ends of the platform sections are supported on posts 22 extending upwardly from the standards 15.

In order to drive the guide chains 17 the sprocket wheels 19 are secured on the upper ends of the rearwardly and downwardly extending shafts 23, the shafts being journaled at their upper ends in the platform sections 20 and being journaled at their lower ends in bearing members 24 mounted upon a transversely extending countershaft 25 journaled in the framework A. The shaft 25 and the shafts 23 are provided with meshing beveled pinions 26, and the shaft 25 receives its motion by means of a sprocket wheel 27 secured thereon, a driving chain 28 passing around said sprocket wheel and over another sprocket wheel 29 mounted on the main driving shaft 30. This shaft 30 receives its motion from the main ground or traveling wheels 1 by means of relatively large sprocket wheels 31 secured to the wheels to move therewith, similar sprocket wheels 32 having a clutch connection with the main drive shaft 30 so that one ground wheel may turn faster than the other (the wheels 32 being pressed into engagement with the clutches by means of springs 33 as shown), and sprocket chains 34 which pass around the sprocket wheels 31 and 32.

The snapping rolls 13 receive their motion in the following manner. Their shafts are provided at their upper rear ends with beveled pinions 35 meshing with corresponding pinions 36 on a transversely extending shaft 37 journaled in brackets secured to the lower ends of the posts 22. A sprocket wheel 38 is secured to the shaft 37 and a driving chain 39 passes around said sprocket wheel and over another wheel 40 mounted on the main drive shaft 30 and preferably secured to the sprocket wheel 29 to turn therewith.

Extending longitudinally along the outer side of each snapping roll 13 is a laterally inclined trough 41 into which the ears fall as they are snapped from the stalk. Each of these troughs contains the upper stretch of an endless chain conveyer 42, the chains of said conveyers passing over idlers 43 at the lower ends of the troughs and over driving sprockets 44 at the upper ends of the troughs, said driving sprockets being secured to a transverse shaft 45 journaled in brackets secured to the upper ends of the standards 15. The shaft 45 receives its motion by means of spur pinions 46 that are secured to the ends of the shafts 45 and 37 respectively. Preferably the snapping mechanism is inclosed at the sides as indicated at 47. Preferably there are retaining rods 48 secured at their front ends to the front of the troughs and at their rear ends to the posts 22, these rods extending along the inner sides of the troughs 41 and strengthening the same and insuring that the inner edges of the troughs shall not sag down and interfere with the proper movement of the snapping blades 16. As the ears, after being snapped from the stalk, fall into the troughs 41 they are carried upwardly and rearwardly therein and are finally discharged into a chute 49 by which they are directed into the husking trough 50, the latter extending rearwardly and downwardly from the snapping mechanism. At the bottom of the trough 50 the longitudinally extending and rearwardly and downwardly sloping husking rolls 51 are mounted, said rolls being provided with any desired numbers of rows of husking pins 52. The shafts of the rolls 51 are provided at their upper and forward ends with bevel pinions 53 meshing with corresponding pinions 54 on a transversely extending driving shaft 55 provided at one end with a sprocket wheel 56, and a driving chain 57 passes around said sprocket wheel and around another sprocket wheel 58 mounted on the main drive shaft 30 and fast with sprocket wheels 40 and 29. These three sprocket wheels are mounted loose on the main driving shaft and are arranged to be clutched thereto by means of a shipper lever 59 pivotally suspended at its upper end from one of the platform sections 20, said shipper lever being connected by a link 60 to a laterally shiftable hand lever 61 fulcrumed on one of the cross bars of the framework and provided with a detent arranged for locking engagement with the quadrant 62. As the corn is husked, it is passed into a transversely disposed chute 63 at the rear end of the framework A, and is passed by said chute into a transversely traveling elevator 64 which deposits it in a wagon or the like drawn along the side of the harvesting machine. The elevator 64 is operated by means of a longitudinal shaft 65 which is provided at its front end with a bevel pinion 66, said pinion meshing with a corresponding pinion 67 on one end of a transverse shaft 68 journaled in bearings secured to the rear ends of the beams 10. At its opposite end the shaft 68 has a sprocket wheel 69 secured to it and a drive chain 70 passes over said sprocket wheel and over a corresponding wheel 71 secured to the transverse counter shaft 25.

From the foregoing description in connection with the accompanying drawings, the practical operation of my improved corn harvesting machine will be apparent. After the machine has been drawn to the field, the driver may throw the actuating mechanism into play by shifting the hand lever 61 to couple the main driving sprockets and shaft 30. As the machine is then drawn forwardly along the rows of standing corn, the stalks will be received between the guards 8 and the guide bars 9, the former serving to straighten any stalks that may be broken down, in connection with the platform sections 20. The stalks will be passed into and between the snapping rolls 13 and the ears will be snapped from the stalks and fall into the troughs 41, where they will be conveyed upwardly and rearwardly to the husking rolls 51, the husks being stripped from the ears and falling to the ground while the husked ears will be passed to the chute 63 and thence to the elevator 64, from whence they will be finally discharged onto a wagon (not shown).

Having thus described the invention, what is claimed as new is;

1. A corn harvesting machine, embodying a wheel supported frame, a main drive shaft having a driving connection with the ground wheels, snapping rolls extending longitudinally of the framework, means for actuating said rolls, chains arranged to run rearwardly above and parallel to said rolls, driving sprockets around which said chains pass, shafts carrying said sprockets and extending downwardly therefrom, a transversely extending countershaft operatively connected to the main driving shaft, bevel pinions mounted on the countershaft and the downwardly extending shafts, respectively, the pinions meshing with each other, a trough arranged at the outer side of each snapping roll, rearwardly traveling conveyers mounted in said troughs, and means for driving said conveyers, said means including a shaft, a gear wheel on said shaft and a pinion meshing with said gear wheel, said last named pinion being mounted on the above named countershaft.

2. A corn harvesting machine, including snapping rolls, a drive shaft, three sprocket wheels loosely mounted on the drive shaft and secured to move together, a transversely extending shaft arranged to drive the snapping rolls, a sprocket wheel mounted on said shaft and operatively connected to one of the said three sprocket wheels on the drive shaft, husking rolls mounted at the rear of the snapping rolls, a shaft arranged to drive the husking rolls, a sprocket wheel mounted on the last named shaft, a chain passing around said last named sprocket wheel and around another one of the sprocket wheels on the main driving shaft, a chain extending around the third sprocket wheel of the main driving shaft, a countershaft extending parallel to the drive shaft, a sprocket wheel on said countershaft and around which the last named chain passes, bevel pinions mounted on the countershaft, chains arranged above the snapping rolls, the inner stretches of the chains traveling rearwardly, front and rear sprocket wheels around which the last named chains pass, shafts to which the rear sprocket wheels are connected, the shafts extending downwardly from said sprocket wheels, pinions carried by said last named shafts at the lower ends thereof and meshing with the pinions on the countershaft, means for supporting the upper ends of the shafts which extend downwardly from the sprocket wheels, and bearing members connecting the lower ends of said shafts with the countershaft.

3. A corn harvesting machine, including snapping rolls, a drive shaft, three sprocket wheels loosely mounted on the drive shaft and secured to move together, a transversely extending shaft arranged to drive the snapping rolls, a sprocket wheel mounted on said shaft and operatively connected to one of the said three sprocket wheels on the drive shaft, husking rolls mounted at the rear of the snapping rolls, a shaft arranged to drive the husking rolls, a sprocket wheel mounted on the last named shaft, a chain passing around said last named sprocket wheel and around another one of the sprocket wheels on the main drive shaft, a chain extending around the third sprocket wheel of the main drive shaft, a countershaft extending parallel to the drive shaft, a sprocket wheel on said countershaft and around which the last named chain passes, bevel pinions mounted on the countershaft, shafts extending upwardly from the countershaft, bevel pinions secured to said upwardly extending shafts and meshing with the pinions on the countershaft, bearing members connecting the lower ends of the upwardly extending shafts with the countershaft, means for supporting the upper ends of the said upwardly extending shafts, sprocket wheels secured to the upper ends of said last named shafts, chains arranged above the snapping rolls, the inner stretches of said chains traveling rearwardly, said chains passing around and being driven by the last named sprocket wheels, the three first named sprocket wheels being arranged for clutching engagement with the drive shaft, a shipper lever connected to all three of said wheels, whereby to move them into and out of connection with the drive shaft, a link connected to the shipper lever, and a hand lever connected to the link.

In testimony whereof I affix my signature in presence of two witnesses.

FLOYD KING. [L. S.]

Witnesses:
J. O. WEITZMANT,
P. W. REMPEL.

---

Copies of this patent may be obtained for five cents each, by addressing the "Commissioner of Patents, Washington, D. C."